Figure 3:
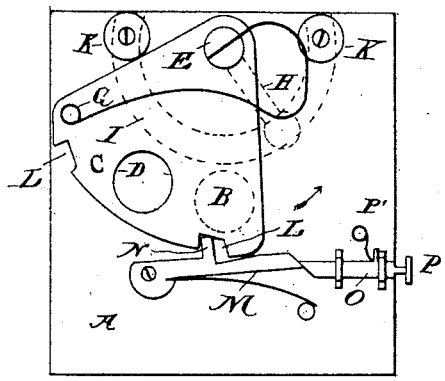

(No Model.) 2 Sheets—Sheet 1.
W. H. LEWIS.
PHOTOGRAPHIC CAMERA SHUTTER.

No. 512,655. Patented Jan. 9, 1894.

WITNESSES:
C. W. Benjamin
Frederick Smith

INVENTOR
William H. Lewis
BY Phillips Abbott
his ATTORNEY (No Model.) 2 Sheets—Sheet 2.

W. H. LEWIS.
PHOTOGRAPHIC CAMERA SHUTTER.

No. 512,655. Patented Jan. 9, 1894.

WITNESSES:
C. W. Benjamin
Frederick Smith

INVENTOR
William H Lewis
BY Phillips Abbott
his ATTORNEY

THE NATIONAL LITHOGRAPHING COMPANY,
WASHINGTON, D. C.

UNITED STATES PATENT OFFICE.

WILLIAM H. LEWIS, OF HUNTINGTON, NEW YORK, ASSIGNOR, BY MESNE ASSIGNMENTS, TO THE BLAIR CAMERA COMPANY, OF BOSTON, MASSACHUSETTS.

PHOTOGRAPHIC CAMERA-SHUTTER.

SPECIFICATION forming part of Letters Patent No. 512,655, dated January 9, 1894.

Application filed June 24, 1889. Serial No. 315,311. (No model.)

*To all whom it may concern:*

Be it known that I, WILLIAM H. LEWIS, a citizen of the United States, and a resident of Huntington, in the county of Suffolk and State of New York, have invented certain new and useful Improvements in Shutters for Photographic Cameras, of which the following is a specification.

My invention relates to an improvement in shutters for photographic cameras and it consists essentially in so constructing the shutter and its coacting parts that it operates as a shutter to make proper exposure of the plate during its movement in both directions, i. e. from right to left and also from left to right.

In the drawings the same reference letters indicate the same parts in all the figures.

Figure 1:
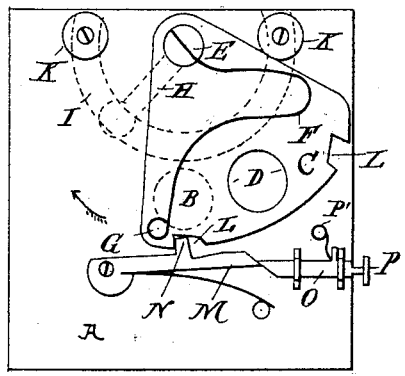
Figure 2:
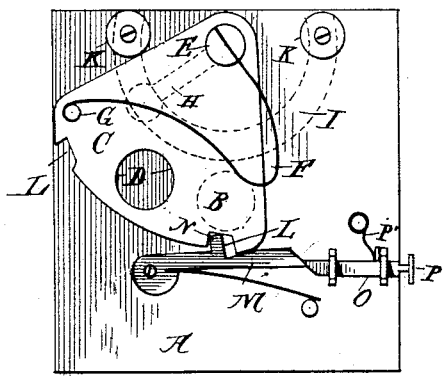
Figure 4:
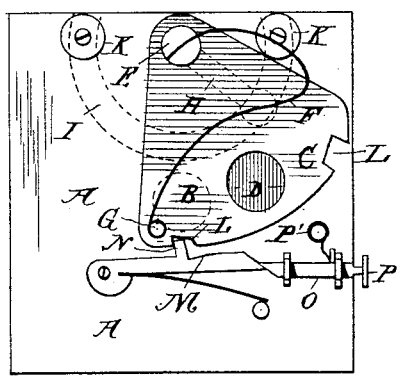
Figure 5:
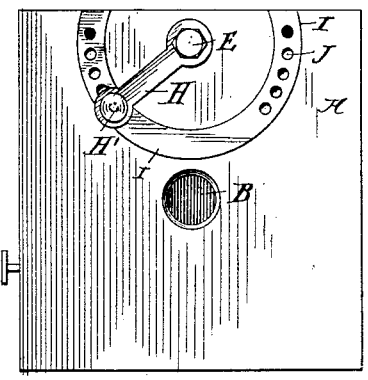

Figure 1. shows a view of the shutter and its co-acting parts in their position as set to throw the shutter from the right to the left in the direction of the arrow. Fig. 2. illustrates a like view of the shutter, it having been operated to make the exposure. Fig. 3. illustrates a like view of the same parts in their position as set to throw the shutter from the left to the right, as also indicated by the arrow. Fig. 4. illustrates a view, the same as Fig. 3, the shutter having been operated. Fig. 5. illustrates a face view of the spring tension lever and co-acting parts on the outside of the camera.

A form of camera has recently come into favor in which the plates and their holders, &c., are so arranged that a sensitive plate is within the field of the lens practically all the time. This necessitates great care that no light should be allowed to enter the camera, excepting at the time of intentional exposure.

My invention, consists in so constructing the shutter and its co-acting parts that no backward movement of the shutter is necessary for resetting; on the contrary, the spring which actuates the shutter has its tension shifted from right to left and left to right, as desired, by the appropriate manipulation of a little lever on the outside of the camera so that the shutter acts to make desired exposure at each movement.

A is the front of the camera, or a plate which is to be attached to the front of the camera as preferred.

B represents the lens tube.

C is the shutter, provided with an opening D coincident with the lens tube, as is well understood.

E is a pivot on which the shutter oscillates. This pivot has an enlarged head to which one end of a spring F, is rigidly attached in any preferred manner. The other end of the spring is fastened to a stud or its equivalent G on the shutter. The pivot E extends through the front of the camera and has a lever, preferably a spring lever, H, attached to it.

I is a rack attached to the front of the camera, having small holes or teeth J, in, or on, it which engage with a pin or a tooth H', on the under side of the lever H as now well understood, whereby the lever is held in position by the engagement of the pin or tooth H' on it in the holes or teeth J of the rack.

K, K, are two stops which limit the movement of the shutter. They may be the projecting inner ends of the rivets, screws or pins, as the case may be, which hold the rack to the camera if desired. Thus these devices will serve two purposes. Any other suitable form of stops may be employed.

L, L, are two recesses or equivalent stops made in or near the lower edge of the shutter, although they may be located at other points if preferred.

M is a pivoted spring-controlled lever having a spur N or its equivalent on it, which engages with the recesses L, L, or their equivalents on the shutter.

O is a spring controlled push lever or trip for the lever M. It projects through either side of the camera in any preferred manner and may be provided with a push button P on its end, whereby it may be conveniently operated from the exterior of the camera to trip the lever M and release the shutter. The spring which controls its normal position is shown at P'. Any other desired construction of this tripping device and also of the holding lever M may be employed.

The operation is obvious, and is as follows: Assume that the first exposure is to be made by the passage of the hole in the shutter across the axis of the lens from right to left, as shown in Fig. 1. The lever H will then be swung into the position shown in dotted lines in Figs. 1 and 2, and engaged in such tooth or hole in the rack I as may be necessary to secure the proper rapidity of movement of the shutter. The higher up the lever is carried of course the stronger the spring tension will be, and consequently the quicker the passage of the shutter will be. The spring F by this operation is put under tension to act from right to left. The "object" being then brought into the field, the lever or push button P is pressed in and the oblique ends of the levers O and M coacting with each other depress the lever M, withdrawing the spur N on it from the recess or equivalent holding device, L, on the shutter in which it previously rested, and the shutter being thus released is instantly carried across to the opposite side of the spring F. The spur on the lever M then engages with the other recess or equivalent device L on the shutter and holds it against return movement when the set or tension of the spring F is reversed. The position of the parts at this stage of the operation is seen in Fig. 2. The reversal of the tension of the spring F may now be secured whereby the shutter will be carried from left to right by moving the lever H from its position in Figs. 1 and 2, to that shown in Figs. 3 and 4, it being again engaged with the rack I as before, at its opposite end however. The position of the parts when the spring tension is reversed and the shutter ready for operation is shown in Fig. 3. The next exposure is then prepared for and upon pushing the button P the opening in the shutter is in the same manner as before carried across the axis of the lens from left to right, the parts then assuming the position shown in Fig. 4.

It is obvious that the lever M may be tripped by suitably arranged pneumatic apparatus, consisting of a compressible bulb with connecting rubber tube or their equivalents as now well understood, and which do not require special description or illustration.

I wish it to be understood that I do not limit myself to the details of construction shown and described because they may be quite extensively departed from and still my invention be employed.

I have found some difficulty in ascertaining a proper construction or shape for the spring F to secure the desired flexibility, activity and reliability in its operation, and find that there are several forms that may be employed, among them that shown in the drawings which gives very satisfactory results.

I claim—

1. The combination with a photographic shutter adapted to open and close a lens opening by a single movement in either direction, of a single tension motor, substantially as described, for operating said shutter positively in opposite directions, and a device for holding the shutter against the power of the motor.

2. The combination with a vibrating shutter having an aperture therein adapted to be moved across a lens opening, of a single tension motor, substantially as described, for moving the shutter in either direction, and means for applying the power of the motor to opppsite sides of the shutter alternately, and a device for holding the shutter against the power of the motor.

3. The combination with a vibrating photographic shutter of a single spring motor, substantially as described, for operating said shutter, means for applying the power of the motor to opposite sides of the shutter alternately, and a catch for retaining the shutter when the motor is set for operation in either direction.

Signed at New York, in the county of New York and State of New York, this 22d day of June, A. D. 1889.

WILLIAM H. LEWIS.

Witnesses:
PHILLIPS ABBOTT,
FREDK. SMITH.